US007536442B2

(12) United States Patent
Kelley et al.

(10) Patent No.: US 7,536,442 B2
(45) Date of Patent: May 19, 2009

(54) METHOD, SYSTEM, AND STORAGE MEDIUM FOR PROVIDING AUTONOMIC IDENTIFICATION OF AN IMPORTANT MESSAGE

(75) Inventors: Edward E. Kelley, Wappingers Falls, NY (US); Tijs Y. Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 1406 days.

(21) Appl. No.: 10/605,437

(22) Filed: Sep. 30, 2003

(65) Prior Publication Data

US 2005/0086307 A1 Apr. 21, 2005

(51) Int. Cl.
*G06F 15/16* (2006.01)
*G06F 21/00* (2006.01)

(52) U.S. Cl. .................... 709/207; 709/206; 726/2; 726/15

(58) Field of Classification Search ............... 709/207, 709/225, 206; 714/39; 726/2, 15
See application file for complete search history.

(56) References Cited

U.S. PATENT DOCUMENTS

| 5,377,354 | A | 12/1994 | Scannell et al. |
| 5,619,648 | A | 4/1997 | Canale et al. |
| 5,884,033 | A | 3/1999 | Duvall et al. |
| 5,999,932 | A | 12/1999 | Paul |
| 6,266,692 | B1 | 7/2001 | Greenstein |
| 6,438,215 | B1 | 8/2002 | Skladman et al. |
| 6,442,594 | B1 | 8/2002 | Ouchi |
| 6,480,885 | B1 | 11/2002 | Oliver |
| 6,546,390 | B1 | 4/2003 | Pollack et al. |
| 6,854,074 | B2 * | 2/2005 | McLellan et al. ............. 714/39 |
| 7,421,498 | B2 * | 9/2008 | Packer ........................ 709/225 |
| 2002/0120600 | A1 | 8/2002 | Schiavone et al. |
| 2003/0009385 | A1 | 1/2003 | Tucciarone et al. |
| 2003/0158904 | A1 * | 8/2003 | Suzuki et al. ............... 709/206 |
| 2003/0229672 | A1 * | 12/2003 | Kohn ......................... 709/207 |
| 2006/0059231 | A1 * | 3/2006 | Takatori et al. ............. 709/206 |

FOREIGN PATENT DOCUMENTS

EP 1 022 668 A2 7/2000

* cited by examiner

*Primary Examiner*—Jungwon Chang
(74) *Attorney, Agent, or Firm*—Cantor Colburn LLP; Ronald Kaschak

(57) ABSTRACT

An exemplary embodiment of the invention relates to a method, system, and storage medium for providing autonomic identification of an important message addressed to a recipient email subscriber. The method includes scanning an email message received over a network operable for identifying a Uniform Resource Locator contained in the email message. If a Uniform Resource Locator is found, the Uniform Resource Locator is compared to the contents of a history file that stores a listing of Uniform Resource Locators previously accessed by the recipient email subscriber. The method also includes performing analytics for the Uniform Resource Locator based upon said contents of the history file, resulting in a rating assigned to the Uniform Resource Locator. If the rating meets a minimum standard set for qualifying the Uniform Resource Locator as relevant, the email message is flagged as relevant and forwarded to the recipient email subscriber.

21 Claims, 13 Drawing Sheets

METHOD, SYSTEM, AND STORAGE MEDIUM FOR PROVIDING AUTONOMIC IDENTIFICATION OF AN IMPORTANT MESSAGE

BACKGROUND OF INVENTION

The present invention relates generally to electronic messaging tools and, more particularly, to a method, system, and storage medium for providing autonomic identification of an important message.

In addition to the exchange of personal communications, email messaging is increasingly becoming a popular tool for marketing as well. This is largely due to its convenience, ease of use, and low implementation costs. As a result, many email users have been inundated with junk email, or "spam", which is often unwelcome or of little or no value to the email recipient. A large amount of unsolicited email can slow down a user's processor, consume a great deal of memory, and distract the user from the important messages that must be individually filtered.

Accordingly, it would be desirable to be able to identify relevant incoming messages and classify or label them as such without any intervention required by the email user.

SUMMARY OF INVENTION

The foregoing discussed drawbacks and deficiencies of the prior art are overcome or alleviated by a method, system, and storage medium for providing autonomic identification of important messages addressed to a recipient email subscriber. In an exemplary embodiment, the method includes scanning an email message received over a network operable for identifying a Uniform Resource Locator contained in the email message. If a Uniform Resource Locator is found, the Uniform Resource Locator is compared to the contents of a history file that stores a listing of Uniform Resource Locators previously accessed by the recipient email subscriber. The method also includes performing analytics for the Uniform Resource Locator based upon said contents of the history file, resulting in a rating assigned to the Uniform Resource Locator. If the rating meets a minimum standard set for qualifying the Uniform Resource Locator as relevant, the email message is flagged as relevant and forwarded to the recipient email subscriber

BRIEF DESCRIPTION OF DRAWINGS

Referring to the exemplary drawings wherein like elements are numbered alike in the several FIGURES.

DETAILED DESCRIPTION

Disclosed herein is a method, system, and storage medium for providing autonomic identification of an important message via a message analysis system. The message analysis system enables email messages to be filtered based upon relevance, allowing email users to select and read only those messages desired. The message analysis system scans email messages for URLs and compares the URLs to an email user's history files. Email messages that contain one or more URL that is determined to be relevant is flagged and sent to the email user.

Figure 1:
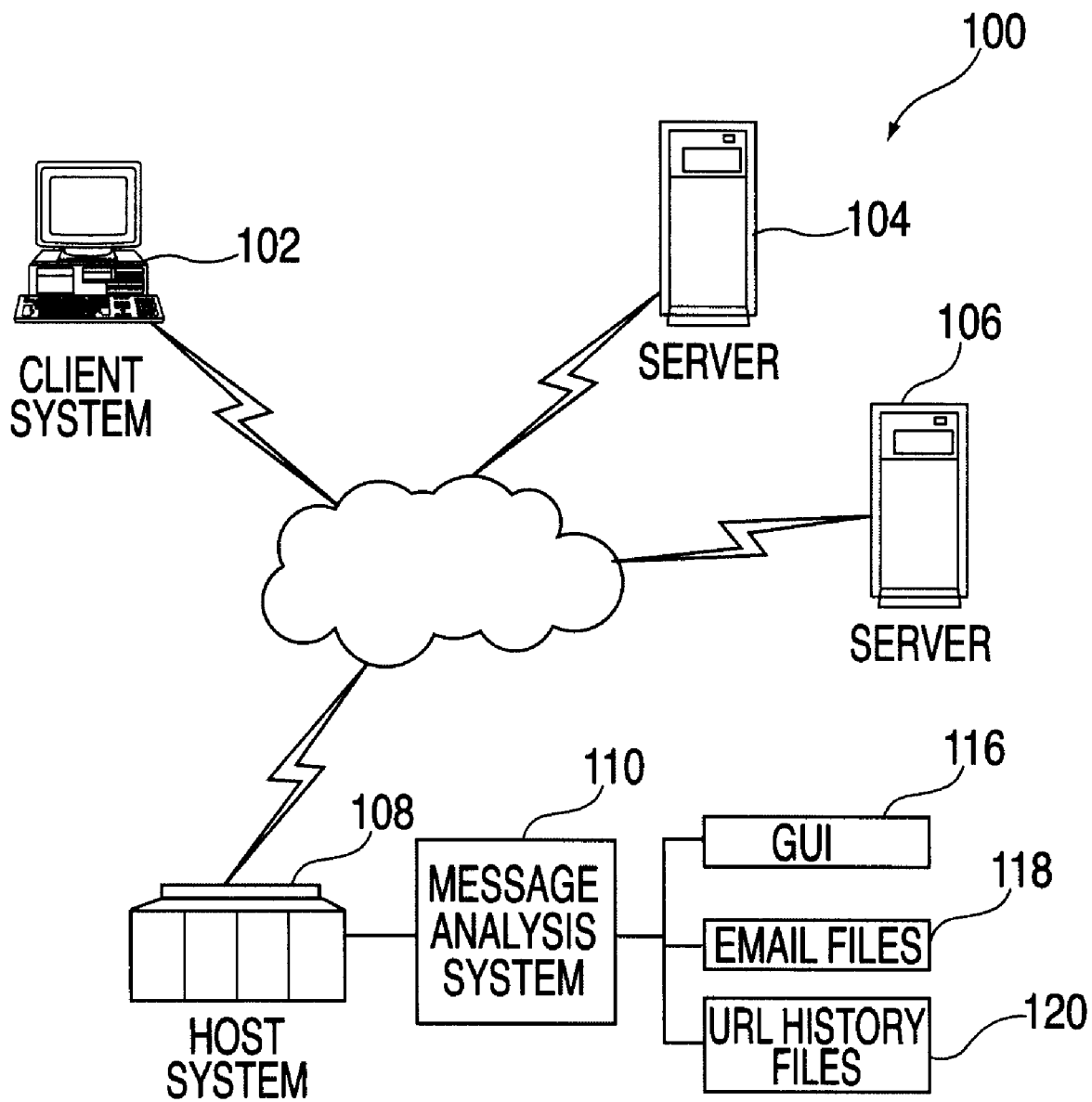
FIG. 1 is a block diagram of a system upon which the message analysis system is implemented in accordance with an exemplary embodiment of the invention.

Referring initially to FIG. 1, there is shown a block diagram of a network system for implementing the message analysis system. Network system 100 includes a computer client system 102 in communication with a host system 108 via a network connection.

Computer client system 102 may be a general-purpose desktop computer that subscribes to an Internet service provider and includes operating system software, an email application, and any other suitable programs that reside in memory and execute on computer client system 102. It will be understood by those skilled in the art that the message analysis system of the invention may be executed on computer systems with variant architectures. Computer client system 102 is in communication with host system 108 via a network connection such as the Internet or other suitable means of networking architecture.

Servers 104, 106 refer to sources of incoming email messages as well as web servers that provide content to computer clients such as client system 102 over the Internet. For example, server 104 may be operated by a business enterprise that maintains a web site for its customers. Server 106 may be an enterprise server or a third party host server that manages large volumes of data on behalf of businesses, individuals, or organizations that outsource the management of their content to the third party host server. While only two servers 104, 106 are shown, it will be understood that any number of servers may be used in order to realize the advantages of the invention.

In one embodiment, host system 108 executes the message analysis system 110 and allows client system 102 to access its features and functions as described further herein. In an alternate embodiment, client system 102 shares execution of the message analysis system 110 with host system 108 or may store the message analysis system internally. In a preferred embodiment, host system 108 is an email provider that maintains a client base of email users and provides access to email and email-related services.

Message analysis system 110 further comprises a graphical user interface 116 for enabling a user of computer client system 102 (also referred to herein as "customer", "email subscriber" or simply "subscriber") to view and respond to relevant messages, as well as to define criteria for refining relevance factors for association with incoming messages as desired. Sample computer screens 300 of FIGS. 3 and 400 of FIG. 4 illustrate the features of the message analysis system graphical user interface 116.

Message analysis system 110 stores URL history files 120 for an email user on client system 102. URL history files 120 track the URLs accessed by the email user in order to perform analysis on the data resulting in a relevance rating for each URL. The weighting process is described further herein.

Host system 108 comprises a high-powered multiprocessor computer device including web server and applications server software for receiving requests from computer client system 102 to access email via the Internet or other network. For example, host system 108 may be operated by an electronic utilities (e-utilities) business that out-sources computing resources such as applications including the message analysis system application 110.

As indicated above, the message analysis system 110 may be executed as a standalone application that is installed or downloaded on computer client system 102 or may be incorporated into an existing messaging application or similar commercially-available product as an enhancement feature. Further, as indicated above, the features of the message analysis system 110 may be provided via a third party application service provider (ASP) or e-utilities broker where service is provided for a per-use fee. These and other embodiments are described further in FIGS. 5-8.

Figure 2:
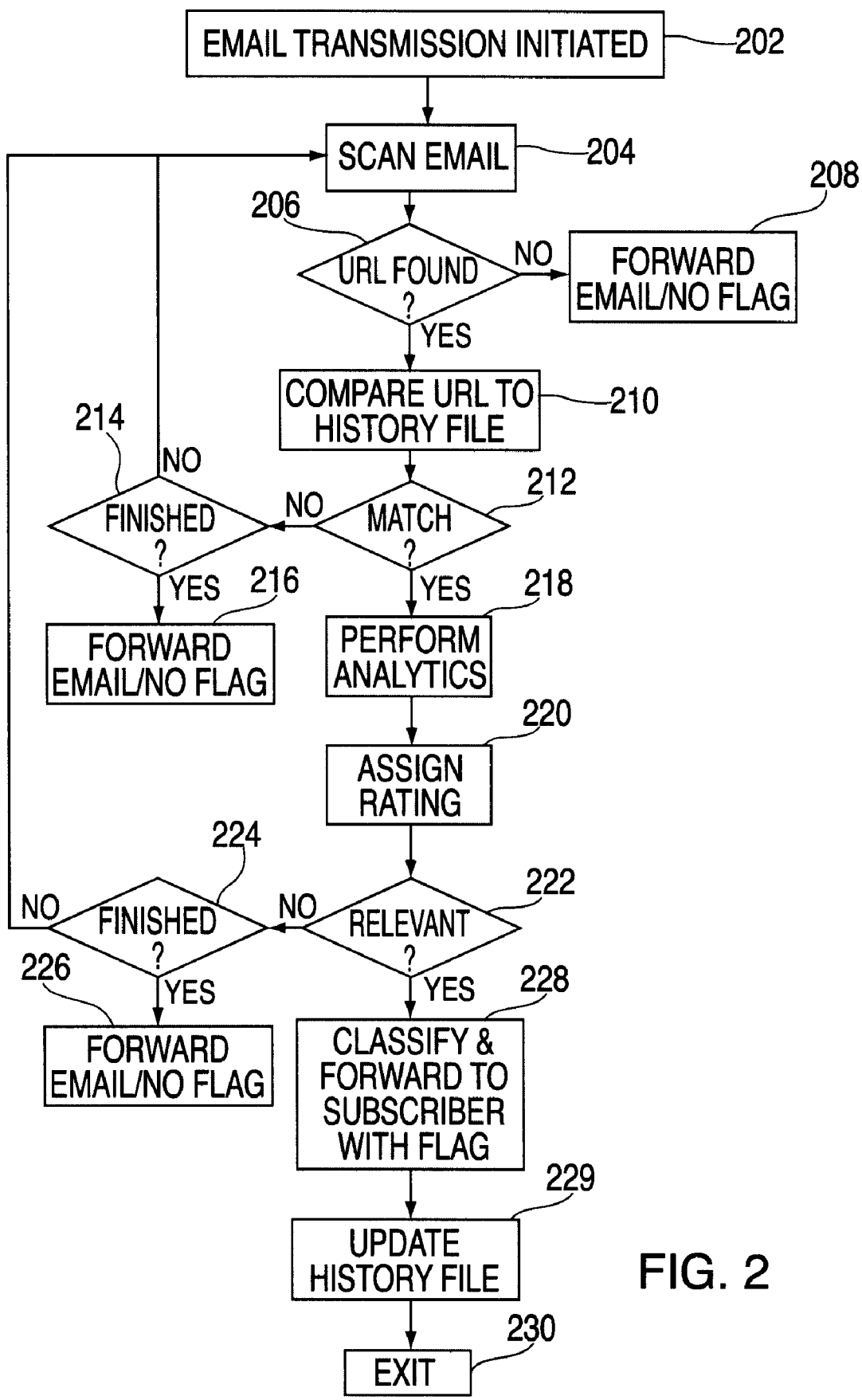
FIG. 2 is a flowchart describing a process of implementing the message analysis system in accordance with a further aspect of the invention.

FIG. 2 is a flowchart describing the process of implementing the message analysis system 110 in a preferred embodiment. Host system 108 detects that an email transmission has been received at step 202. The message analysis system 110 scans the email message looking for URLs at step 204. At step 206 it is determined whether a URL has been located in the scanned email. If not, then the email message is forwarded to the email recipient without a relevance flag and waits for the next email transmission at step 208. If a URL has been found at step 206, the message analysis system 110 compares the URL to the email recipient's history file 120 at step 210. The message analysis system 110 determines whether the URL matches a URL in the email recipient's history file 120 at step 212. If there is no match, the message analysis system 110 determines if the entire email message has been scanned at step 214. If so, the email is sent to the recipient with no relevance flag at step 216 and waits for the next email transmission. Otherwise, the message analysis system 110 continues to scan the email message at step 204.

If the URL does in fact match a URL in the recipient's history file 120 at step 212, the message analysis system 110 performs analytics on the history file 120 based upon the URL found at step 218. An analytic engine may be employed by the message analysis system 110 which looks at a variety of factors such as the frequency in which the recipient has accessed the URL as indicated in the history file 120, how recently the URL has been accessed by the recipient, and other similar factors. These factors may be weighted and applied according to business rules adopted in order to establish a hierarchy of relevant URLs whereby one or more URLs drop off the relevance list when another URL scores higher during a subsequent analysis at step 220. This weighting of factors and qualifying standards may be useful in limiting the number of URLs likely to be labeled as relevant, allowing for flexibility as a recipient's interest in web content changes over time. At step 222, it is determined whether the URL is relevant based upon the analysis and rating steps. If not, the message analysis system determines whether the email message has been completely scanned at step 224. If so, the email is forwarded to the recipient with no relevance flag at step 226, otherwise, the message analysis system continues to scan the email at step 204.

If the URL meets the minimum standards set for relevance at step 222, the email is qualified as relevant and forwarded to the email recipient with a relevance flag at step 228. Once the recipient email subscriber opens the flagged email message and URL contained therein, the message analysis system 110 updates the history file 120 to reflect this at step 229 and the process ends at step 230.

Figure 3:
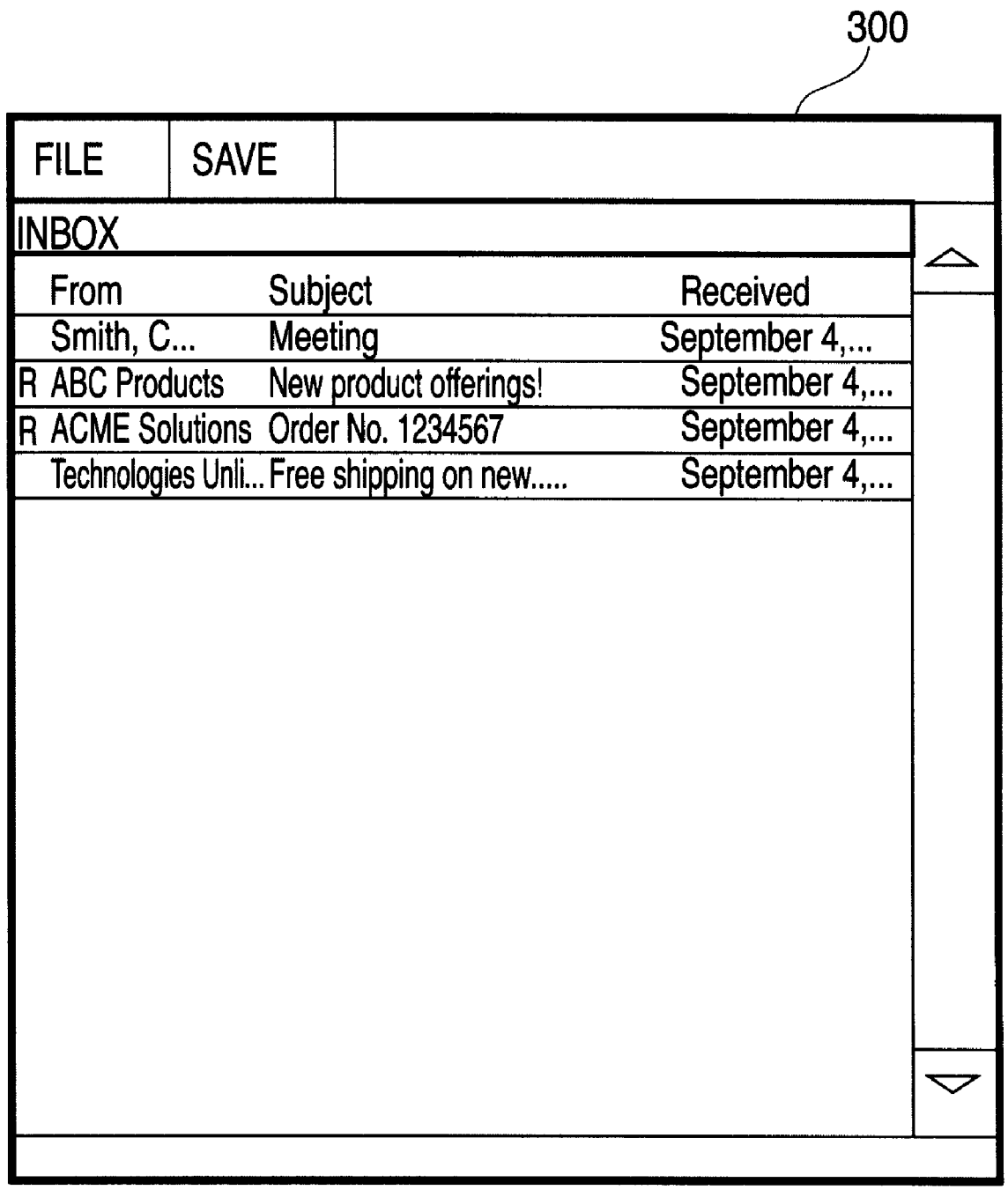
FIG. 3 illustrates a sample computer screen window as seen by a user of the message analysis system, in accordance with a further aspect of the invention.
Figure 4:
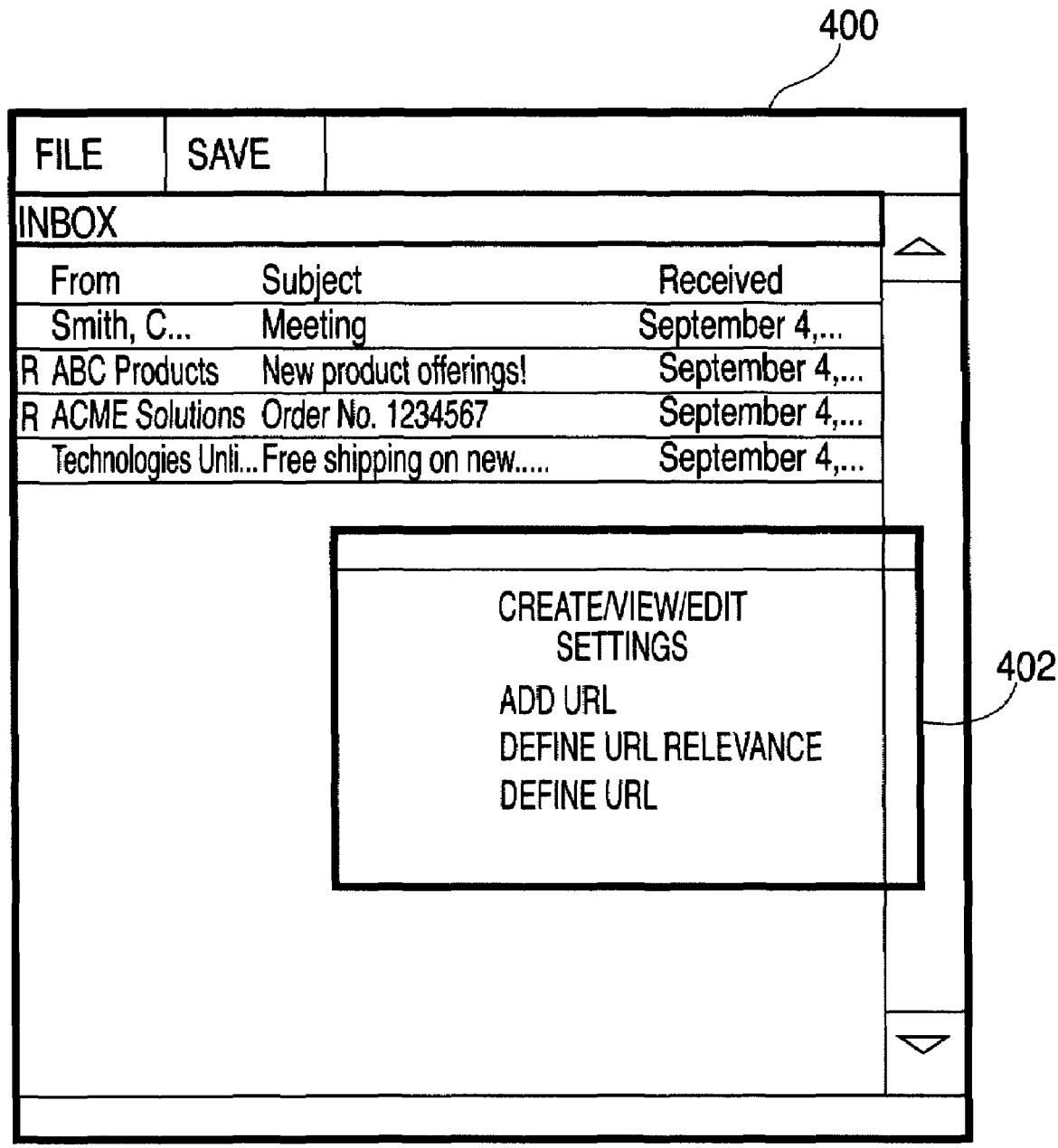
FIG. 4 illustrates a sample computer screen window for establishing relevance criteria for emails in an exemplary embodiment.

FIG. 3 illustrates a sample computer screen window that includes an email window with messages processed by the message analysis system 110. Email messages determined to be relevant are flagged as shown in FIG. 3. While the letter "R" has been used to flag relevant messages, it will be understood that any indicator of relevance may be utilized by the invention. Examples of flags that may be used to identify and distinguish relevant email messages include letter symbols, number symbols, pictorial symbols, audio symbols, and color symbols, to name a few.

FIG. 4 illustrates a computer screen window as seen by a user of the message analysis system graphical user interface 116 for establishing relevance criteria in an exemplary embodiment of the invention. Graphical user interface 116 includes a window 402 of menu options that allow a subscriber to view, edit, and customize the relevance of URLs and factors for determining relevance. The message analysis system 110 may be customized to allow the subscriber to establish business rules for determining what URLs are relevant. For example, the subscriber may assign relevance to a specific URL, establish limits on a number of URLs that may be considered relevant, prescribe weighting factors based upon criteria such as measures of URL usage or access, as well as time factors.

The message analysis system of the present invention may, as previously described reside on a stand-alone computer system which may have access to the Internet, or may reside on a computer system which is part of the network through which there is Internet access. With a connection to a network and/or the Internet, there are several different ways in which the process software used to implement the systems and methods of the present invention may be integrated with the network, and deployed using a local network, a remote network, an e-mail system, and/or a virtual private network. The following descriptions review the various ways of accomplishing these activities.

Integration of message analysis system software: To implement the message analysis systems and methods of the present invention, process software, which is composed of the software as described above and related components including any needed data structures, is written and then if desired, integrated into a client, server and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of the same with reference to the flowcharts of FIGS. 5A and 5B.

The first step in the integration activity is to identify any software on the clients and servers where the process software will be deployed that are required by the process software or that need to work in conjunction with the process software.

This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems are identified and compared to the list of operating systems, version numbers and network software that have been tested to work with the process software. Those operating systems, version numbers and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. In view of the foregoing general description of the integration activity, the following detailed description of the same should be readily understood.

Figure 5A:
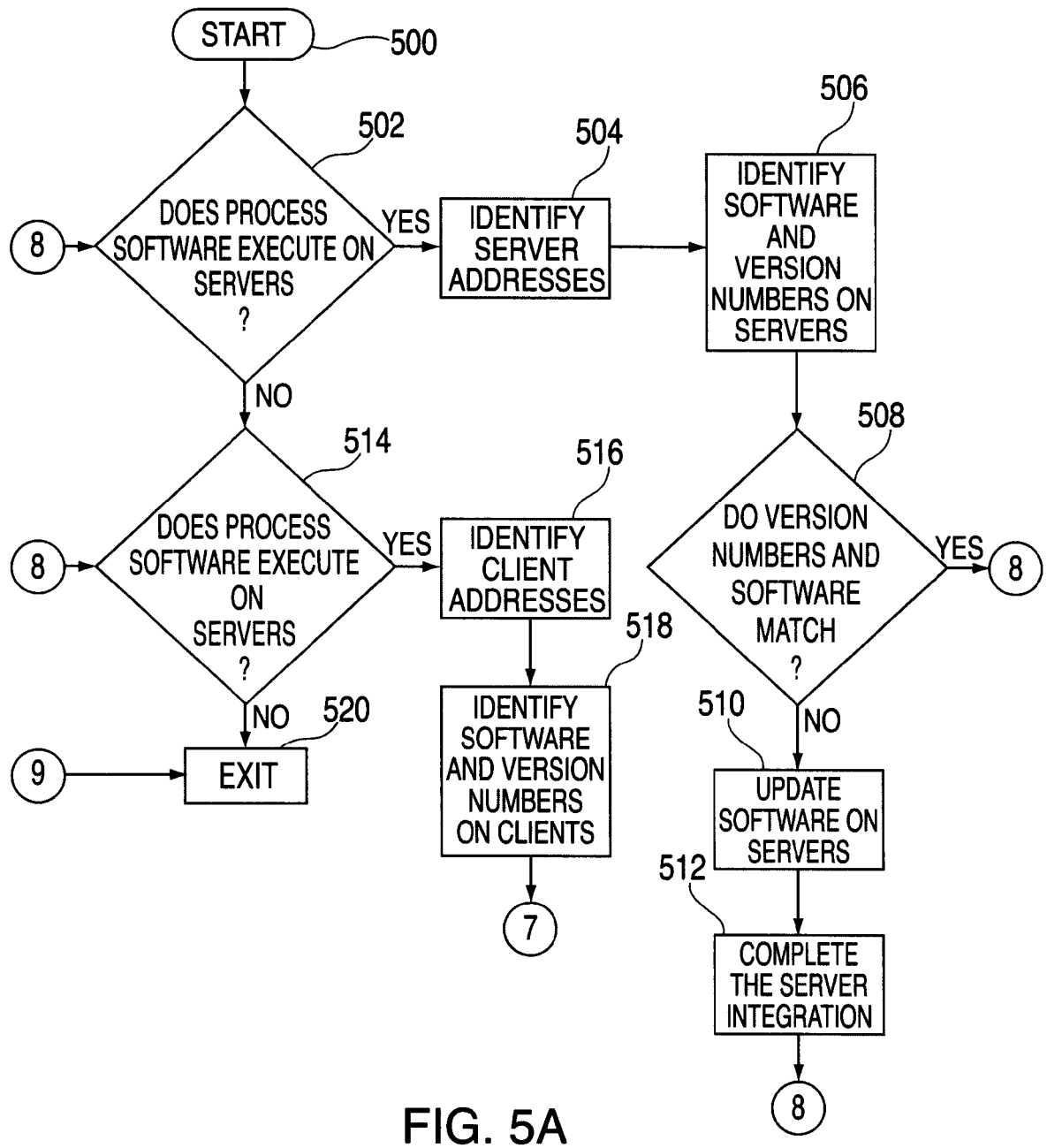
FIGS. 5A and 5B are flowcharts illustrating how the process software implementing the systems and methods of the invention may be integrated into client, server, and network environments.
Figure 5B:
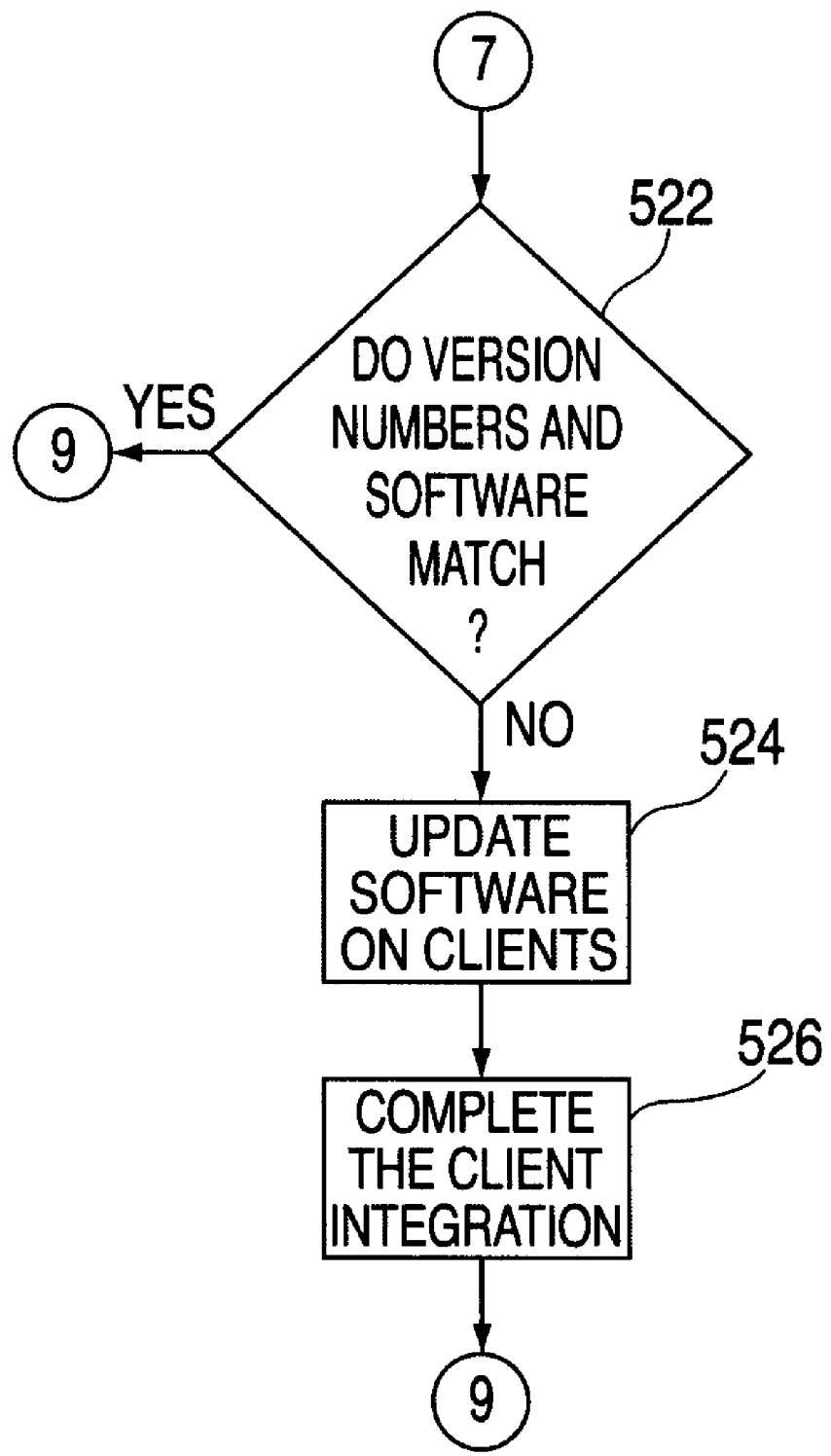

Referring to FIGS. 5A and 5B, step 500 begins the integration of the process software for implementing the message analysis systems and methods of the present invention. It is determined whether there are any process software programs that will execute on a server or servers at step 502. If this is not the case, then integration proceeds to determine if the process software will execute on clients at step 514. If this is the case, then the server addresses are identified at step 504. The servers are checked to see if they contain software that includes the operating system (OS), applications, and network operating systems (NOS), together with their version numbers, that have been tested with the process software at step 506. The servers are also checked to determine if there is any missing software that is required by the process software as part of the activity at step 506. A determination is made if the version numbers match the version numbers of OS, applications and NOS that have been tested with the process software at step 508. If all of the versions match and there is no missing required software the integration continues at step 514. If one or more of the version numbers do not match, then the unmatched versions are updated on the server or servers with the correct versions at step 510. Additionally, if there is missing required software, it is updated on the server or servers at step 510. The server integration is completed by installing the process software at step 512.

Step 514, which follows either of steps 502, 508 or 512, determines if there are any programs of the process software that will execute on the clients. If no process software programs execute on the clients, the integration proceeds to step 520 and exits. If this not the case, then the client addresses are identified at step 516.

At step 518, the clients are checked to see if they contain software that includes the operating system (OS), applications, and network operating systems (NOS) software, together with their version numbers, that have been tested with the process software. The clients are also checked at step 518 to determine if there is any missing software that is required by the process software.

At step 522, a determination is made if the version numbers match the version numbers of OS, applications and NOS that have been tested with the process software. If all of the versions match and there is no missing required software, then the integration proceeds to step 520 and exits.

If one or more of the version numbers do not match, then the unmatched versions are updated on the clients with the correct versions at step 524. In addition, if there is any missing required software, it is updated on the clients as part of step 524. The client integration is completed by installing the process software on the clients at step 526. The integration proceeds to step 520 and exits.

Deployment of message analysis system software: It should be well understood that the process software for implementing the message analysis system of the present invention may be deployed by manually loading the process software directly into the client, server and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. In view of this general description of the possible deployment processes, the following detailed description of same with reference to FIGS. 6A and 6B, where the deployment processes are illustrated, will be more easily understood.

Step 600 begins the deployment of the process software. It is determined whether there are any programs that will reside on a server or servers when the process software is executed at step 602. If the answer is "yes", then the servers that will contain the executables are identified, as indicated in step 636 in FIG. 6B. The process software for the server or servers is transferred directly to the servers storage via FTP or some other protocol or by copying though the use of a shared file system at step 638. The process software is then installed on the servers as indicated at step 640.

Figure 6A:
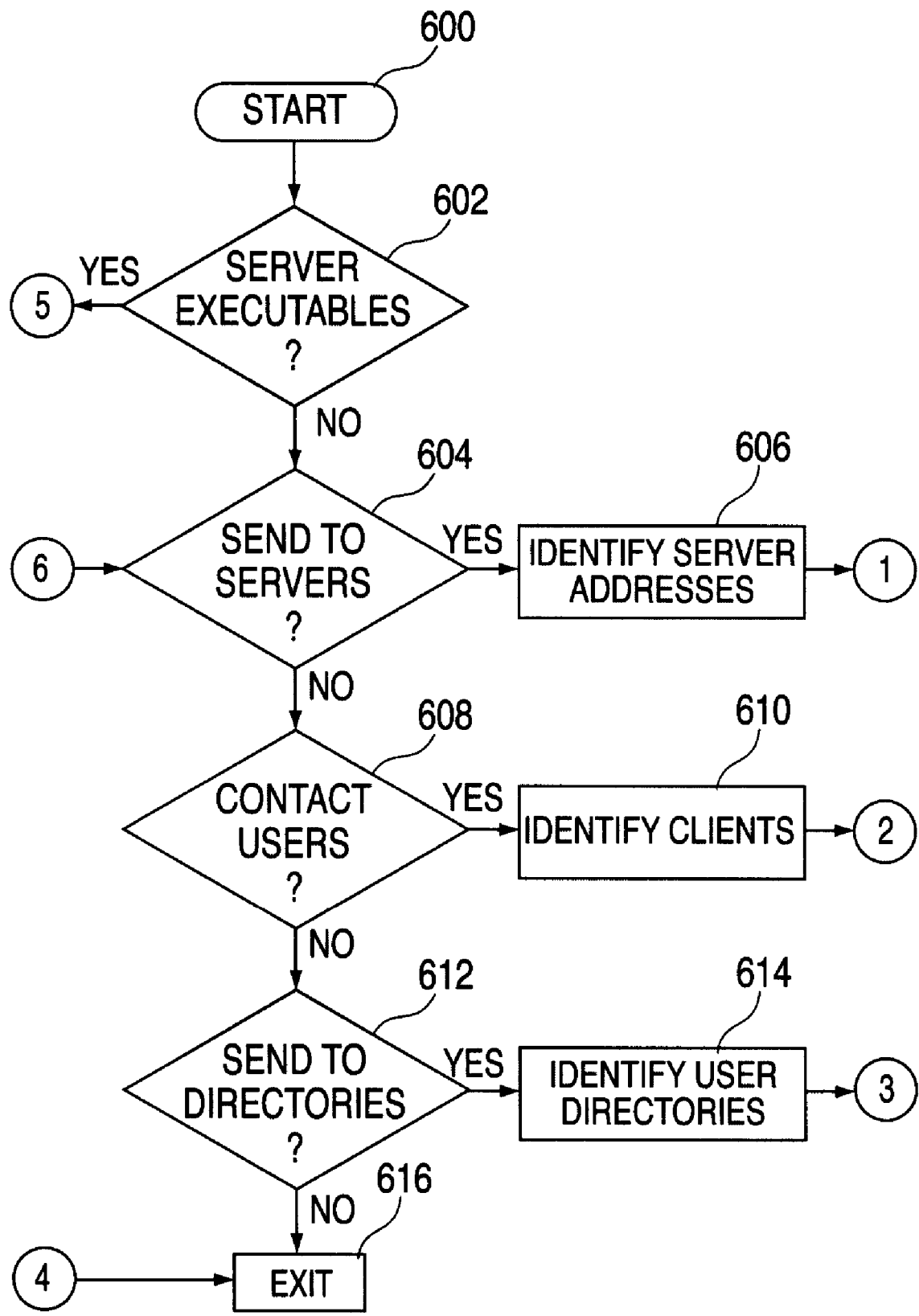
FIGS. 6A and 6B are flowcharts illustrating various ways in which the process software of the invention may be semi-automatically or automatically deployed across various networks and onto server, client (user), and proxy computers.
Figure 6B:
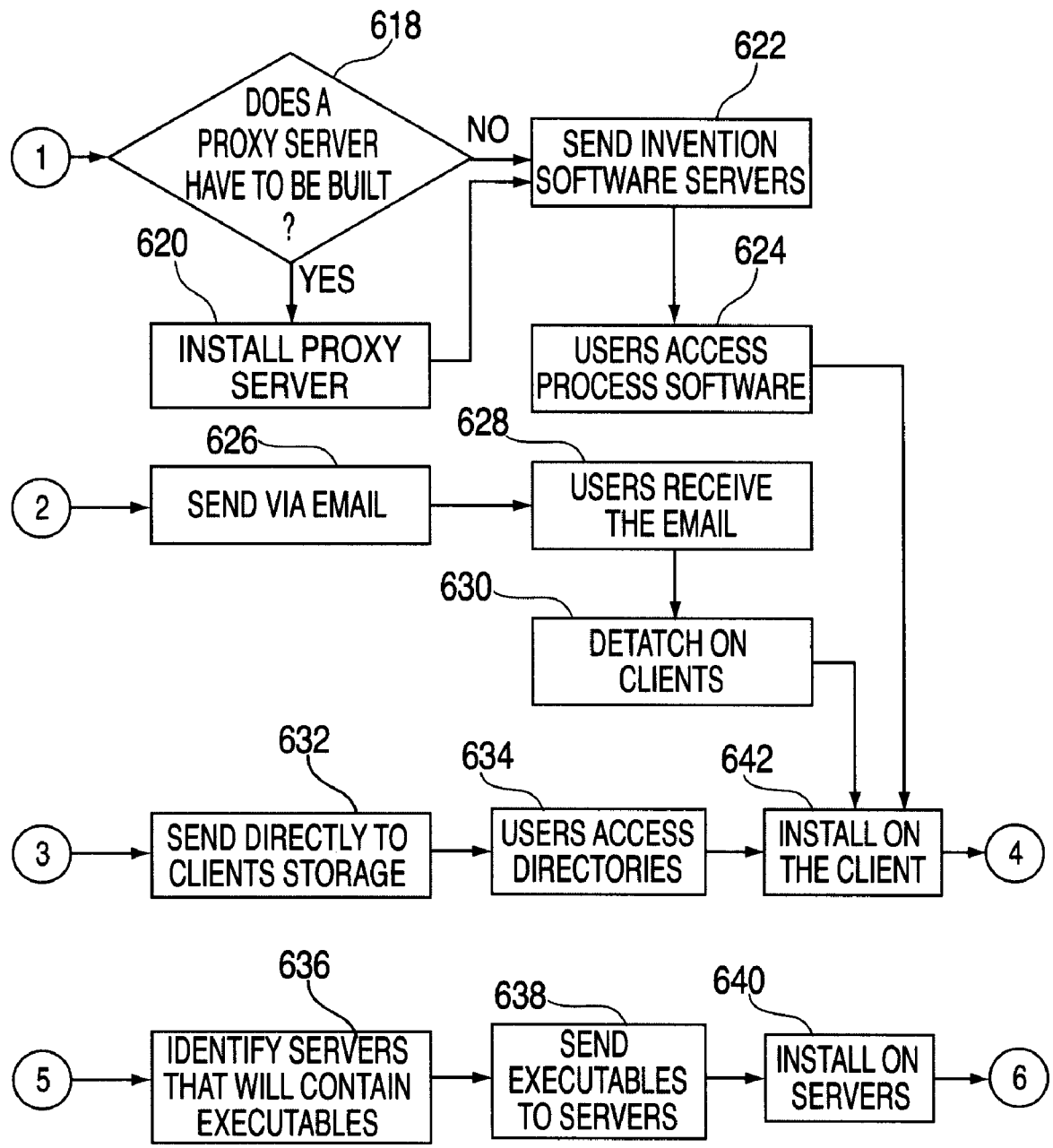

Next, as shown in step 604 in FIG. 6A, a determination is made on whether the process software is to be deployed by having users access the process software on a server or servers. If the users are to access the process software on servers, then the server addresses that will store the process software are identified at step 606.

Next, as shown at step 618, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, it is installed as indicated at step 620. Next, the process software for implementing the present invention is sent to the servers, as indicated in step 622 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their client computers, then access the process software on the servers and copy it into to the file systems of their client computers at step 624. Another alternative is to have the servers automatically copy the process software to each client and then run the installation program for the process software at each client computer. Either way, the user computer executes or causes to be executed the program that installs the process software on the client computer at step 642, then the process exits at step 616.

Continuing now at step 608 in FIG. 6A, a determination is made as to whether the process software is to be deployed by sending the process software to users via email. If the answer is yes, then, as indicated at step 610, the set of users where the process software will be deployed are identified together with the addresses of the user client computers. The process software is sent via email in step 626 (shown in FIG. 6B) to each of the users' client computers. As indicated in step 628, the users receive the e-mail, and detach the process software from the e-mail to a directory on their client computers at step 630. The user then executes the program that installs the process software on his client computer at step 642 and exits the process at step 616.

Continuing at step 612 (see bottom of FIG. 6A), a determination is made of whether the process software will be sent directly to user directories on their client computers. If so, the user directories are identified at step 614. Then, the process software is transferred directly to the identified directory on user's client computer, as indicated in step 632. This can be done in several ways such as, but not limited to, sharing the file system directories and copying from the sender's file system to the recipient user's file system or, alternatively, using a transfer protocol such as File Transfer Protocol (FTP). Next, the users access the directories on their client file systems, as indicated in step 634, in preparation for installing the process software. Finally, the user executes the program that installs the process software on his client computer at step 642 and then exits the process at step 616.

Use of Virtual Private Networks for message analysis system software: The process software may be deployed, accessed, and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee(s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed, and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (e.g., a toll-free number) or attach directly via a cable, DSL, or wireless modem to reach the NAS and use their VPN client software to access the corporate network and to access, download, and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. In view of the foregoing general description of virtual private networks and how they operate and how they may be used to transport the process software, the following more detailed description of same with reference to the flowcharts of FIGS. 7A-7C should be more readily understood.

Figure 7A:
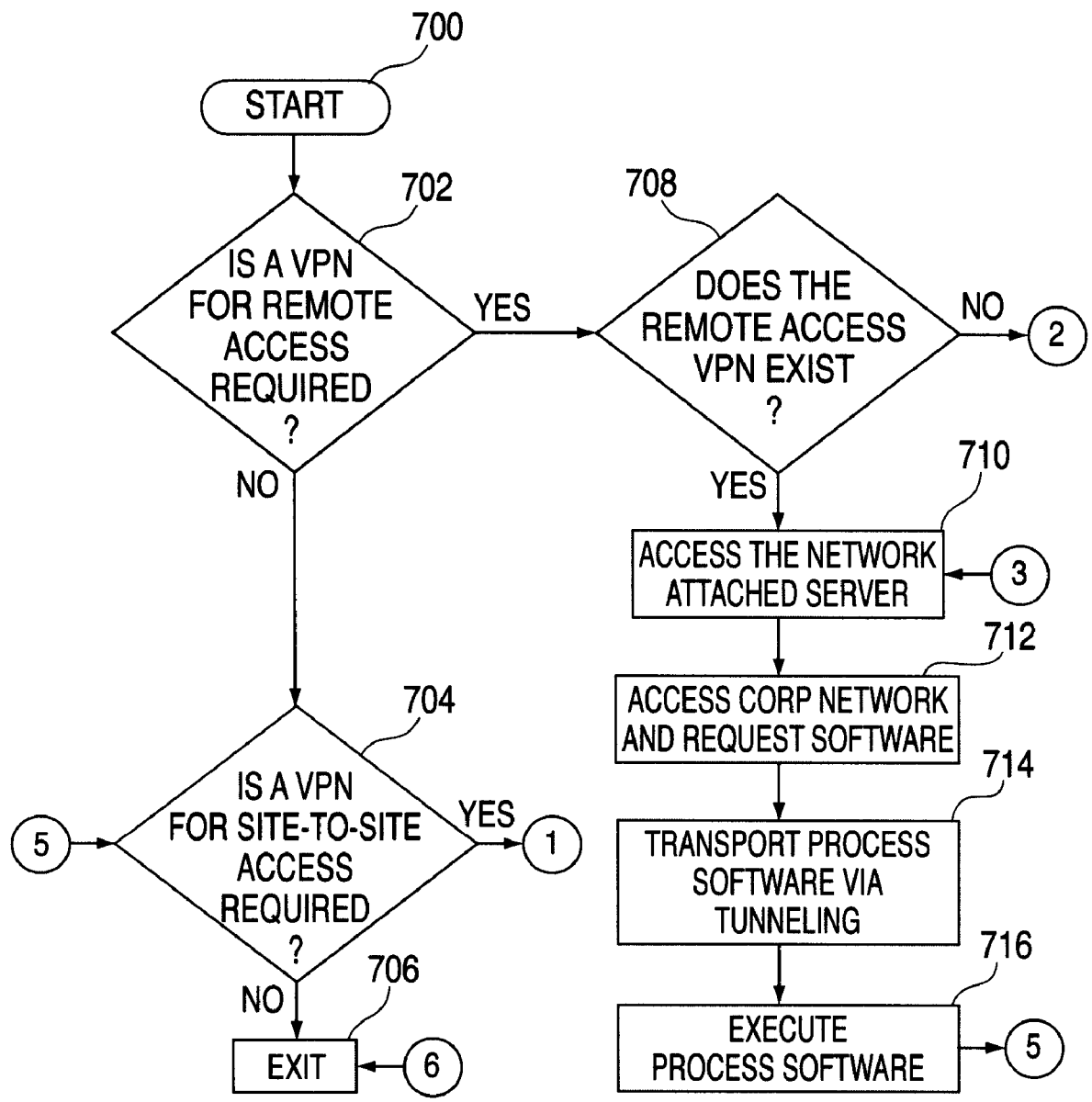
FIGS. 7A through 7C are flowcharts illustrating how process software for implementing the systems and methods of the invention are deployed through the installation and use of two different forms of a virtual private network (VPN)
Figure 7B:
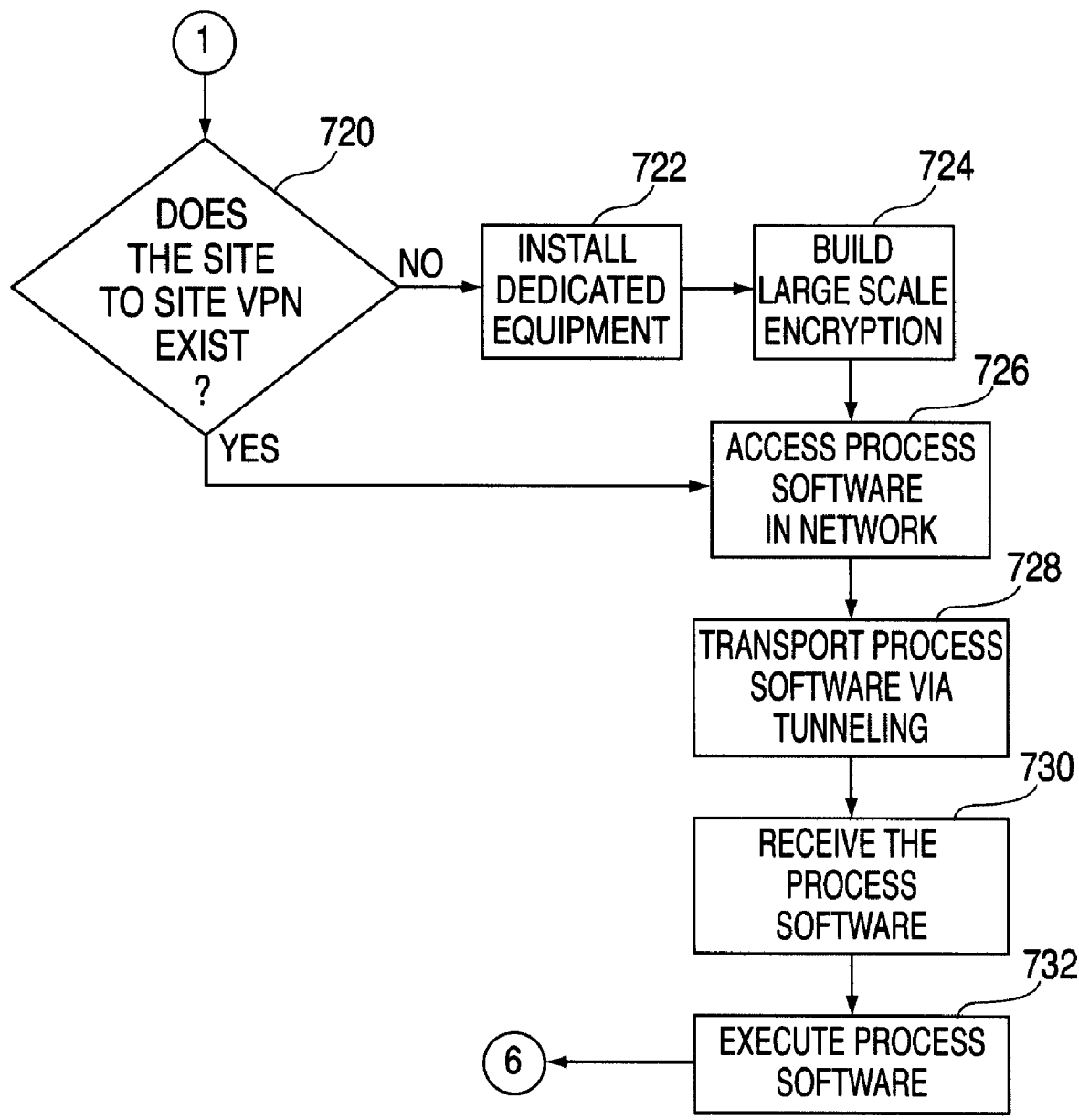
Figure 7C:
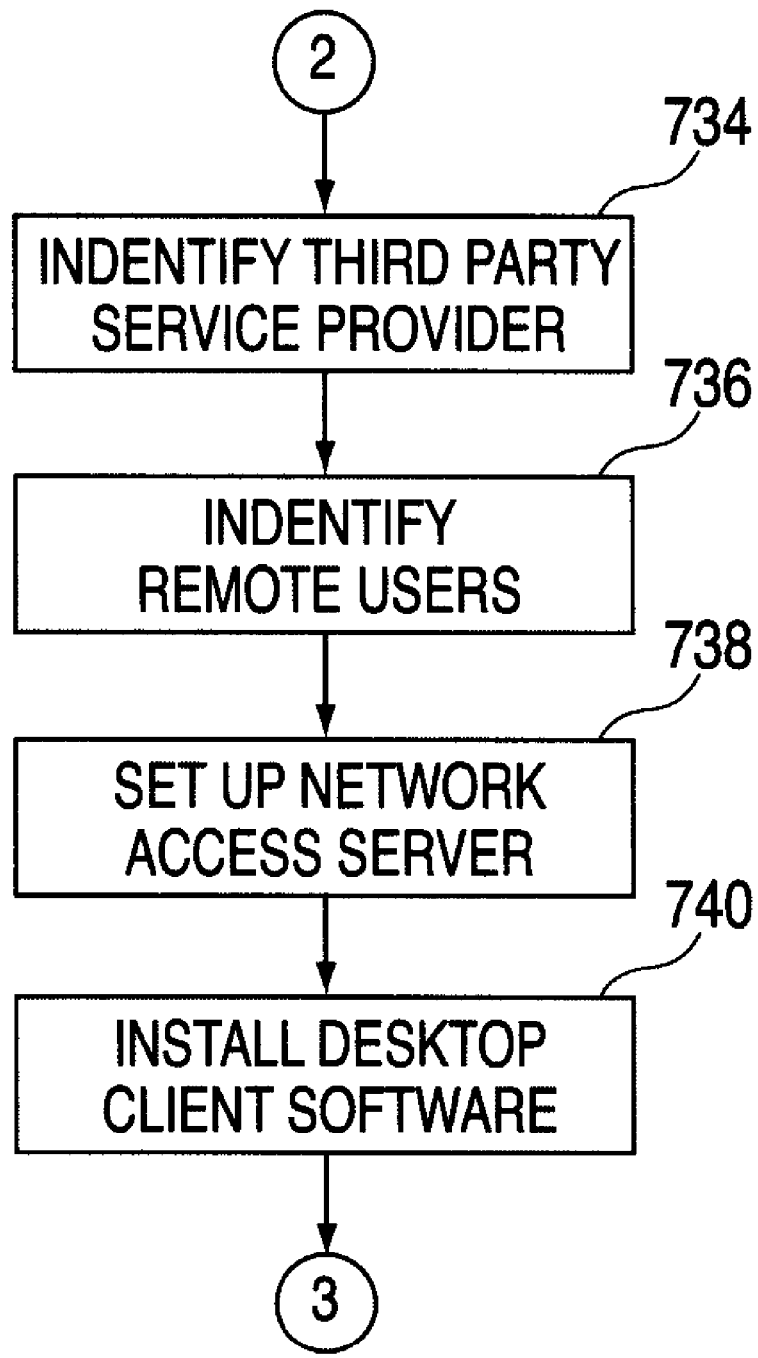
Figure 8A:
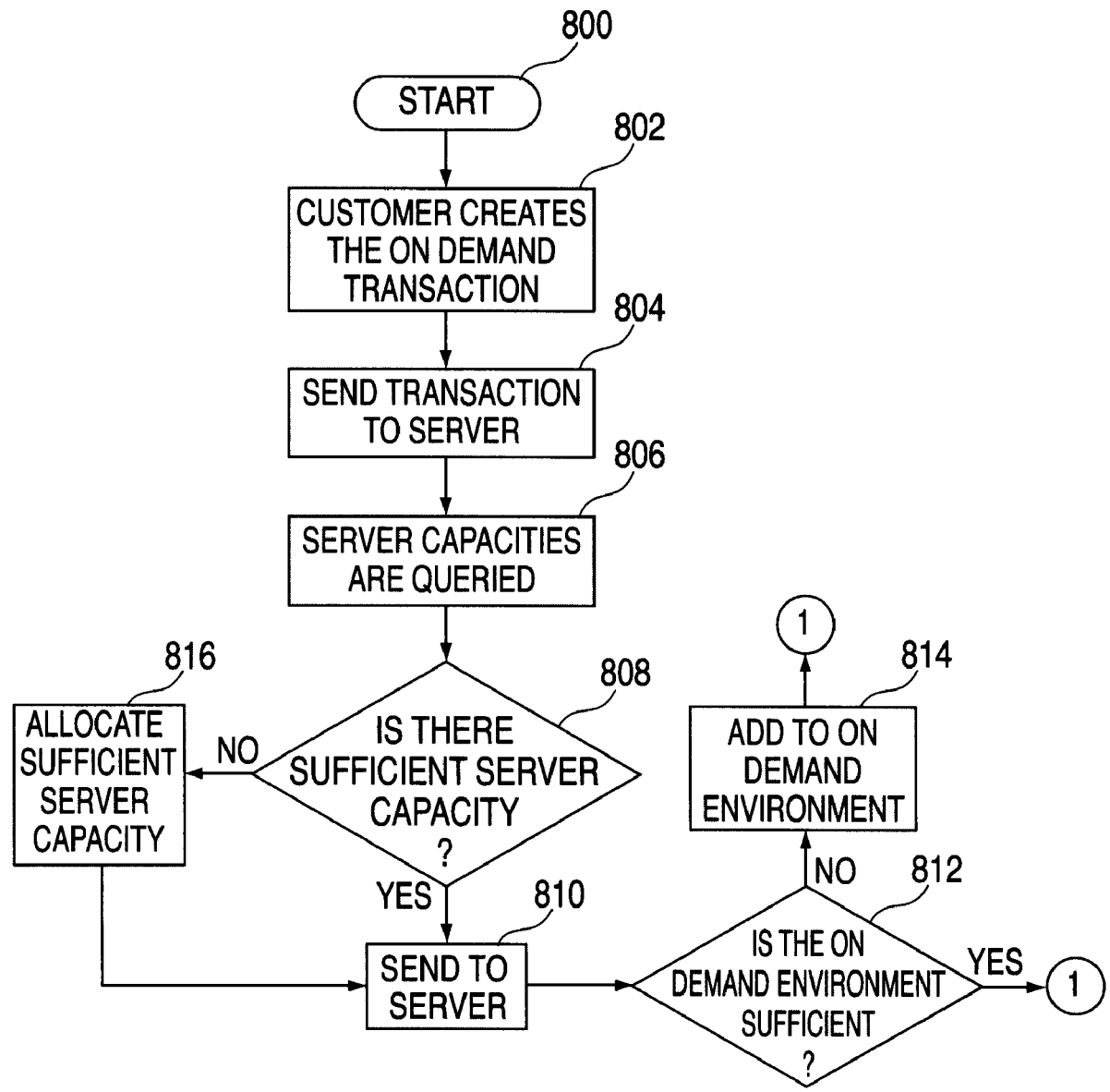
FIGS. 8A and 8B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 8B:
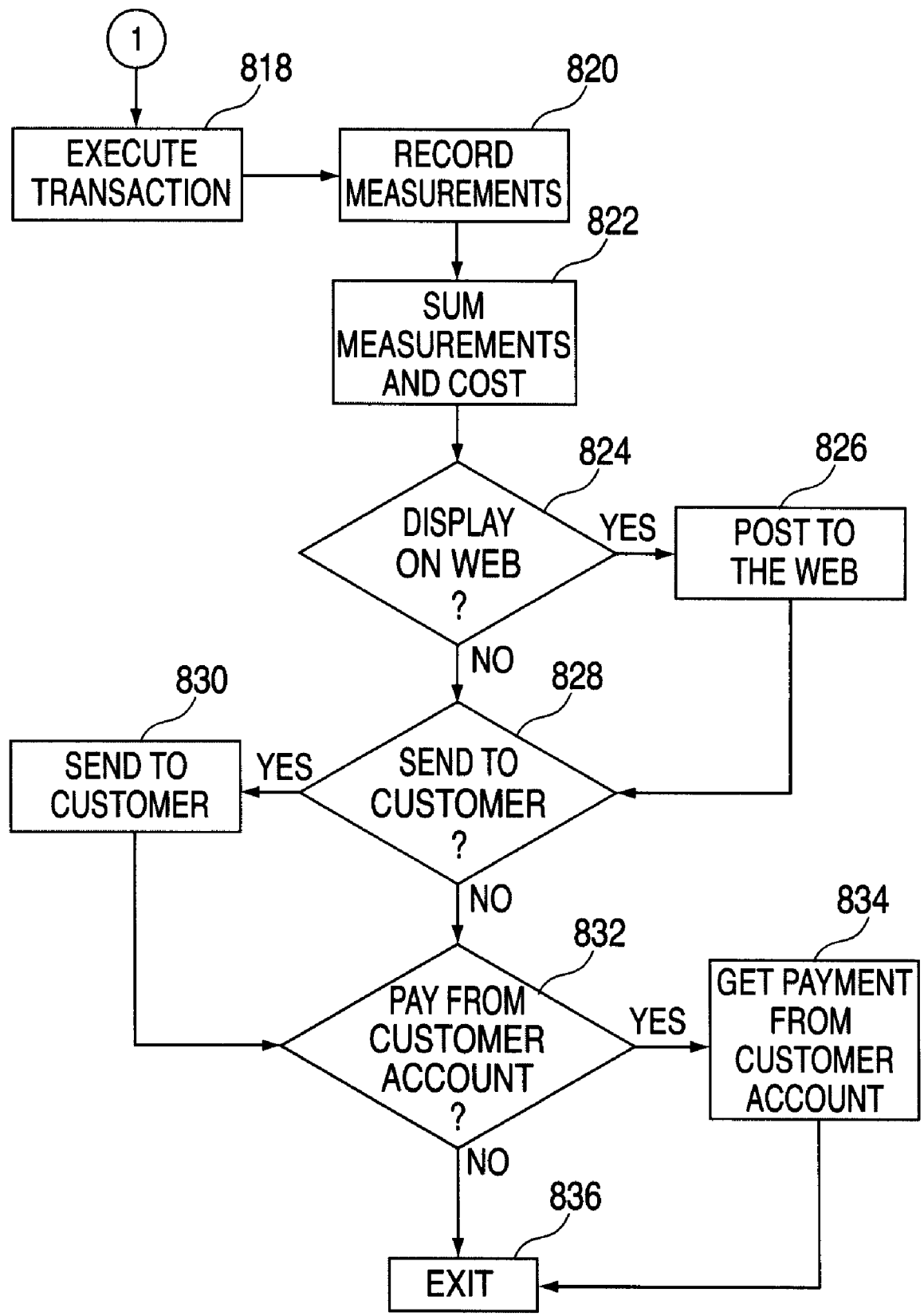

Step 700 in FIG. 7A begins the virtual private network (VPN) process. A determination is made at step 702 to see if a VPN for remote access is required. If it is not required, then flow proceeds to step 704. If it is required, then flow proceeds to step 708 where a determination is made if as to whether a remote access VPN exists that is available for use.

If a remote access VPN does exist, then flow proceeds to step 710 in FIG. 7A. Otherwise flow proceeds to step 734 (see top of FIG. 7C), where a third party provider that will provide the secure, encrypted connections between the company's private network and the company's remote users is identified. Next, as indicated in step 736, the company's remote users are identified. At step 738, the identified third party provider sets up a network access server (NAS). The NAS allows the remote users to dial a phone number (typically a toll free number) or attach directly via a cable, DSL, wireless, or other modem to access, download, and install the desktop client software for the remote-access VPN as indicated at step 740.

Returning to step 710 in FIG. 7A, after the remote access VPN has been built or if it been previously installed, the remote users can then access the process software by dialing into the NAS or attaching directly via a cable, DSL, or other modem into the NAS. This step 710 allows entry into the corporate network, as indicated at step 712, where the process software may be accessed. The process software is transported to the remote user's desktop computer over the network via tunneling. During tunneling (step 714), the process software is divided into packets and each packet, including the data and protocol for that packet, is placed within another packet. When the process software arrives at the remote user's desktop computer, it is removed from the packets, reconstituted, and then may be executed on the remote users desktop, as indicated at step 716.

Returning now to step 704 in FIG. 7A, a determination is made to see if a VPN for site-to-site access is required. If it is not required, then flow proceeds to the exit at step 706. If it is required, flow proceeds to step 720 (see top of FIG. 7B) to determine if the site-to-site VPN exists. If it does exist, then flow proceeds to step 726. If it does not exist, then as indicated at step 722, dedicated equipment required to establish a site-to-site VPN is installed. Then a large-scale encryption is built into the VPN at step 724.

After the site-to-site VPN has been built, or if it had been previously established, the users access the process software via the VPN as indicated in step 726. Next, the process software is transported to the site users over the network via tunneling as indicated in step 728. As previously explained, the process software is divided into packets and each packet including the data and protocol is placed within another packet, as indicated in step 730. When the process software arrives at the remote user's desktop, it is removed from the packets, reconstituted, and executed on the site users desktop at step 732. The process proceeds to step 706 and exits.

On Demand Computing for message analysis system software: The process software for implementing the message analysis system of the present invention may be shared; that is, it may be used to simultaneously serve multiple customers in a flexible, automated fashion. Process software is easily standardized, requires little customization, and is scalable, thus providing capacity on demand in a pay-as-you-go model known as "on demand" computing. An overview of on demand computing as applied to the message analysis software will now be provided, followed by a more detailed description of same made with reference to the flowcharts of FIGS. 8A and 8B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. In view of the foregoing general description, (that is, the detailed description of on demand computing with respect to the process software), the following detailed description of the same with reference to FIGS. 8A and 8B, where the on demand processes are illustrated, will be more easily understood.

Step 800 begins the On Demand process. A transaction is created that contains the unique customer identification, the requested service type and any service parameters that further specify the type of service as indicated in step 802. The transaction is then sent to the main server as shown in step 804. In an On Demand environment the main server can initially be the only server, then as capacity is consumed other servers are added to the On Demand environment.

The server central processing unit (CPU) capacities in the On Demand environment are queried at step 806. The CPU requirement of the transaction is estimated, then the servers available CPU capacity in the On Demand environment are compared to the transaction CPU requirement to see if there is sufficient CPU available capacity in any server to process the transaction as indicated in step 808. If there is not sufficient server CPU available capacity, then additional server CPU capacity is allocated to process the transaction as indicated in step 816. If there was already sufficient available CPU capacity, the transaction is sent to a selected server at step 810.

Before executing the transaction, a check is made of the remaining On Demand environment to determine if the environment has sufficient available capacity for processing the transaction as indicated at step 812. This environment capacity consists of such things as but not limited to network bandwidth, processor memory, storage, etc. If there is not sufficient available capacity, then capacity will be added to the On Demand environment as indicated in step 814. Next the required software to process the transaction is accessed, loaded into memory, then the transaction is executed as indicated in step 818.

The usage measurements are recorded as indicated in step 820. The usage measurements consist of the portion of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer as indicated in step 822.

If the customer has requested that the On Demand costs be posted to a web site as indicated in step 824, then they are posted to a web site at step 826. If the customer has requested that the On Demand costs be sent via e-mail to a customer address as indicated in step 828, then they are sent to the customer via e-mail as indicated in step 830. If the customer has requested that the On Demand costs be paid directly from a customer account at step 832, then payment is received directly from the customer account at step 834. The On Demand process proceeds to step 836 and then exits.

As will be appreciated from the above description, the restrictions and limitations that exist with messaging systems are efficiently overcome. The message analysis system of the invention enables users of email and instant messaging systems to work interoperably, allowing them to switch between messaging systems, in order to improve overall communicational efficiency.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method for providing autonomic identification of an important message addressed to a recipient email subscriber, comprising:
   scanning an email message received over a network, said scanning operable for identifying a Uniform Resource Locator contained in said email message; and
   if a Uniform Resource Locator is found:
      comparing said Uniform Resource Locator with contents of a history file, said history file storing a listing of Uniform Resource Locators previously accessed by said recipient email subscriber;
      performing analytics for said Uniform Resource Locator based upon said contents of said history file, said performing analytics resulting in a rating assigned to said Uniform Resource Locator; and
   if said rating meets a minimum standard set for qualifying said Uniform Resource Locator as relevant:
      flagging said email message; and
      forwarding said email message with a flag to said recipient email subscriber;
   wherein the method further comprises deploying, accessing, and executing process software for providing said autonomic identification of an important message addressed to a recipient email subscriber, said deploying, accessing, and executing process software implemented through a virtual private network, the method further comprising:
      determining if a virtual private network is required;
      checking for remote access to said virtual private network when it is required;
      if said remote access does not exist, identifying a third party provider to provide secure, encrypted connections between a private network and remote users;
      identifying said remote users; and
      setting up a network access server operable for downloading and installing client software on desktop computers for remote access of said virtual private network;
      accessing said process software;
      transporting said process software to at least one remote user's desktop computer; and
      executing said process software on said at least one remote user's desktop computer.

2. The method of claim 1, further comprising:
   forwarding said email message without a flag to said recipient email subscriber if at least one of:
   a Uniform Resource Locator has not been found; and
   a rating fails to meet said minimum standard set for qualifying said Uniform Resource Locator as relevant.

3. The method of claim 1, further comprising:
   updating contents of said history file to include said Uniform Resource Locator found as a result of said scanning.

4. The method of claim 1, wherein said performing analytics for said Uniform Resource Locator based upon contents of said history file includes at least one of:
   evaluating frequency in which said recipient email subscriber accessed said Uniform Resource Locator;
   evaluating how recently said recipient email subscriber accessed said Uniform Resource Locator; and
   evaluating said Uniform Resource Locator in context with relevance rules established by said recipient email subscriber.

5. The method of claim 4, wherein said relevance rules include at least one of:
   assigning relevance to a specific Uniform Resource Locator;
   establishing limits on a number of Uniform Resource Locators qualified to be relevant;
   applying weighting factors to specific types of Uniform Resource Locators; and
   applying weighting factors to Uniform Resource Locators based upon measurements of usage and time factors.

6. The method of claim 1, wherein said flagging said email message includes associating said email message with at least one of a:
   letter symbol;
   number symbol;
   pictorial symbol;
   audio symbol; and
   color symbol.

7. The method of claim 1, further comprising:
   determining if said virtual private network has a site-to-site configuration for providing site-to-site access, and if said virtual private network is not so available, installing equipment required to establish a site-to-site configuration for said virtual private network;
   installing large scale encryption into said site-to-site virtual private network; and
   accessing said process software through said site-to-site configuration with large scale encryption.

8. The method of claim 7, wherein said accessing said process software further comprises at least one of:
   dialing into said network access server, and
   attaching directly via a modem into said network access server, said modem being selected from the group of modems consisting of telephone dial-up modems, cable modems, DSL modems, and wireless modems.

9. A storage medium encoded with machine-readable computer program code for providing autonomic identification of an important message addressed to a recipient email subscriber, said storage medium including instructions for causing a computer to implement a method, comprising:

scanning an email message received over a network, said scanning operable for identifying a Uniform Resource Locator contained in said email message; and if a Uniform Resource Locator is found:

comparing said Uniform Resource Locator with contents of a history file, said history file storing a listing of Uniform Resource Locators previously accessed by said recipient email subscriber;

performing analytics for said Uniform Resource Locator based upon said contents of said history file, said performing analytics resulting in a rating assigned to said Uniform Resource Locator; and if said rating meets a minimum standard set for qualifying said Uniform Resource Locator as relevant:

flagging said email message; and forwarding said email message with a flag to said recipient email subscriber;

wherein the storage medium further comprises instructions for causing said computer to implement deploying, accessing, and executing process software for providing autonomic identification of an important message addressed to a recipient email subscriber through a virtual private network, said deploying, accessing, and executing process software including:

determining if a virtual private network is required;

checking for remote access to said virtual private network when it is required;

if said remote access does not exist, identifying a third party provider to provide secure, encrypted connections between a private network and remote users;

identifying said remote users;

setting up a network access server for downloading and installing client software on desktop computers for remotely accessing said virtual private network;

accessing said process software;

transporting said process software to at least one remote user's desktop computer; and executing said process software on said at least one remote user's desktop computer.

10. The storage medium of claim 9, further comprising instructions for causing said computer to implement:

forwarding said email message without a flag to said recipient email subscriber if at least one of:

a Uniform Resource Locator has not been found; and a rating fails to meet said minimum standard set for qualifying said Uniform Resource Locator as relevant.

11. The storage medium of claim 9, further comprising instructions for causing said computer to implement:

updating contents of said history file to include said Uniform Resource Locator found as a result of said scanning.

12. The storage medium of claim 9, wherein said performing analytics for said Uniform Resource Locator based upon contents of said history file includes at least one of:

evaluating frequency in which said recipient email subscriber accessed said Uniform resource Locator;

evaluating how recently said recipient email subscriber accessed said Uniform Resource Locator; and evaluating said Uniform Resource Locator in context with relevance rules established by said recipient email subscriber.

13. The storage medium method of claim 12, wherein said relevance rules include at least one of:

assigning relevance to a specific Uniform Resource Locator;

establishing limits on a number of Uniform Resource Locators qualified to be relevant;

applying weighting factors to specific types of Uniform Resource Locators; and applying weighting factors to Uniform Resource Locators based upon measurements of usage and time factors.

14. The storage medium of claim 9, wherein said flagging said email message includes associating said email message with at least one of a:

letter symbol;

number symbol;

pictorial symbol;

audio symbol; and color symbol.

15. The storage medium of claim 9, further comprising instructions for causing said computer to implement:

determining if said virtual private network has a site-to-site configuration for providing site-to-site access, and if said virtual private network is not so available, installing equipment required to establish a site-to-site configuration for said virtual private network;

installing large scale encryption into said site-to-site virtual private network; and accessing said process software through said site-to-site configuration with large-scale encryption;

wherein said accessing said process software includes at least one of:

dialing into said network access server; and attaching directly via a modem into said network access server, said modem being selected from the group of modems consisting of telephone dial-up modems, cable modems, DSL modems and wireless modems.

16. A message analysis system for providing autonomic identification of an important message addressed to a recipient email subscriber, comprising:

a computer processor; and a message analysis system application executing on the computer processor, the message analysis system application implementing a method, the method comprising:

scanning an email message received over a network, said scanning operable for identifying a Uniform Resource Locator contained in said email message; and if a Uniform Resource Locator is found:

comparing said Uniform Resource Locator with contents of a history file, said history file storing a listing of Uniform Resource Locators previously accessed by said recipient email subscriber;

performing analytics for said Uniform Resource Locator based upon said contents of said history file, said performing analytics resulting in a rating assigned to said Uniform Resource Locator; and if said rating meets a minimum standard set for qualifying said Uniform Resource Locator as relevant:

flagging said email message; and forwarding said email message with a flag to said recipient email subscriber;

wherein the method further comprises deploying, accessing, and executing process software for providing autonomic identification of an important message addressed to a recipient email subscriber through a virtual private network, said deploying, accessing, and executing process software including:

determining if a virtual private network is required;

checking for remote access to said virtual private network when it is required;

if said remote access does not exist, identifying a third party provider to provide secure, encrypted connections between a private network and remote users;

identifying said remote users;

setting up a network access server for downloading and installing client software on desktop computers for remotely accessing said virtual private network;

accessing said process software;

transporting said process software to at least one remote user's desktop computer; and executing said process software on said at least one remote user's desktop computer.

17. The system of claim 16, wherein the message analysis system application further performs:

forwarding said email message without a flag to said recipient email subscriber if at least one of:

a Uniform Resource Locator has not been found; and a rating fails to meet said minimum standard set for qualifying said Uniform Resource Locator as relevant.

18. The system of claim 16, wherein the message analysis system application further performs:

updating contents of said history file to include said Uniform Resource Locator found as a result of said scanning.

19. The system of claim 16, wherein said incoming email message determined to be relevant by said message analysis system is flagged with at least one of a:

letter symbol;

number symbol;

pictorial symbol;

audio symbol; and color symbol.

20. The system of claim 16, wherein said performing analytics for said Uniform Resource Locator based upon contents of said history file includes at least one of:

evaluating frequency in which said recipient email subscriber accessed said Uniform Resource Locator;

evaluating how recently said recipient email subscriber accessed said Uniform Resource Locator; and evaluating said Uniform Resource Locator in context with relevance rules established by said recipient email subscriber.

21. The system of claim 20, wherein said relevance rules include at least one of:

assigning relevance to a specific Uniform Resource Locator;

establishing limits on a number of Uniform Resource Locators qualified to be relevant;

applying weighting factors to specific types of Uniform Resource Locators; and applying weighting factors to Uniform Resource Locators based upon measurements of usage and time factors.

* * * * *